United States Patent
Hoffman

[11] Patent Number: 5,970,670
[45] Date of Patent: Oct. 26, 1999

[54] INTUMESCENT FIRE ARRESTER COLLAR FOR PIPELINES

[75] Inventor: William H. Hoffman, Walderslade, United Kingdom

[73] Assignee: J.W. Bollom & Co., Ltd., Kent, United Kingdom

[21] Appl. No.: 08/817,627

[22] PCT Filed: Aug. 1, 1996

[86] PCT No.: PCT/GB96/01888

§ 371 Date: Jul. 1, 1997

§ 102(e) Date: Jul. 1, 1997

[87] PCT Pub. No.: WO97/04838

PCT Pub. Date: Feb. 13, 1997

[30] Foreign Application Priority Data

Aug. 2, 1995 [GB] United Kingdom .................. 9515858

[51] Int. Cl.[6] .............................. E04B 1/94; F16L 5/00
[52] U.S. Cl. ............................. 52/232; 52/317; 285/192
[58] Field of Search ..................... 52/232, 317, 790.1; 285/192, 358; 137/75

[56] References Cited

U.S. PATENT DOCUMENTS

| | | | |
|---|---|---|---|
| 4,086,736 | 5/1978 | Landrigan | 52/232 X |
| 4,237,667 | 12/1980 | Pallucci et al. | 285/192 X |
| 4,307,546 | 12/1981 | Dolder . | |
| 4,538,389 | 9/1985 | Heinen | 52/232 X |
| 4,559,745 | 12/1985 | Wexler . | |
| 4,796,401 | 1/1989 | Wexler | 52/232 |
| 4,848,043 | 7/1989 | Harbeke | 52/232 X |
| 4,850,385 | 7/1989 | Harbeke | 52/232 X |
| 4,894,966 | 1/1990 | Bailey et al. | 52/232 X |
| 5,103,609 | 4/1992 | Thoreson et al. | 52/232 |
| 5,257,641 | 11/1993 | Elsbury et al. . | |
| 5,421,127 | 6/1995 | Stefely . | |

FOREIGN PATENT DOCUMENTS

| | | | |
|---|---|---|---|
| 506497 | 9/1992 | European Pat. Off. . | |
| 1513543 | 6/1978 | United Kingdom . | |
| 1589890 | 5/1981 | United Kingdom . | |
| 2270936 | 3/1994 | United Kingdom | 52/232 |

*Primary Examiner*—Carl D. Friedman
*Assistant Examiner*—Winnie S. Yip
*Attorney, Agent, or Firm*—Pillsbury Madison & Sutro LLP

[57] ABSTRACT

A fire collar (10) is supported around a plastic material pipe (30) extending through a bore (32) in a wall (44). The fire collar (10) comprises a cylindrical metal collar (12) carrying a layer of intumescent material (36) on its inner circumferential surface. A sleeve (22) of fire resistant material is attached to the metal collar (10) and extends within the collar and around the pipe (30). In the event of a fire the pipe (30) melts. The intumescent material (36) is constrained to expand radially inwardly and as it does so it pushes the fabric sleeve (22) radially inwardly. The sleeve (22) and the espanded intumescent material (36) together form a physical barrier across the fire collar (10) which blocks the bore (32)

18 Claims, 4 Drawing Sheets

INTUMESCENT FIRE ARRESTER COLLAR FOR PIPELINES

This application is the national phase of international application PCT/GB96/01888 filed Aug. 1, 1996 which designated the U.S.

BACKGROUND OF THE INVENTION

The present invention relates to a method of protecting a bore in a partition using a fire collar and to a fire collar for use in such a method.

Increasingly, plastics material pipes are used in buildings. Such pipes extend through bores in partitions such as walls, floors and ceilings. In the event of a fire such pipes melt or collapse whereby the bore in the barrier provides a channel for the transmission of the fire or smoke or other products therefrom through that partition.

It is obviously important, in the event of a fire, that partitions remain able to contain the fire for as long as possible and fire collars are increasingly provided to ensure that any channel remaining by the melting or collapse of a plastics material pipe is blocked. Generally, the fire collar comprises a metal collar fastened around a pipe, the collar enclosing intumescent material between the collar and the piping. When fire causes the pipe to melt, it also causes the intumescent material between the collar and the piping. When fire causes the pipe to melt, it also causes the intumescent material to expand. The fire collar prevents expansion outwardly, so that the expansion of the intumescent material is inwardly to fill the void left by the melted pipe. In this way, a physical barrier is formed across the bore in which the pipe was arranged.

However, various authorities, including those in the USA, now require that the physical barrier formed across the bore, for example, by the intumescent material, should be capable of withstanding the force of water from a fire hose. Otherwise, attempts using fire hoses to put out the fire can, in fact, break open the bore through the partition and encourage the spread of the fire therethrough.

Various attempts have been made to provide fire collars which are capable of maintaining a partition fireproof even though a plastics material pipe extending therethrough has melted. Examples of proposed devices are described, for example, in British specifications Nos. 1,513,543 and 1,589,890 and U.S. Pat. Nos. 4,307,546, 4,559,745, 5,257,641, and 5,421,127. However, such prior proposals all require the use of more or less complex mechanical devices which are moved by the collapse of the plastics material pipe, for example, to mechanically position a physical barrier across the bore.

SUMMARY OF THE INVENTION

It is an object of the present invention to provide a method of protecting a bore in a partition using a fire collar and to provide such a fire collar which is capable of providing a physical barrier across the bore without the use of mechanical contrivances.

According to a first aspect of the present invention, there is provided a method of protecting a bore in a partition through which meltable piping extends, the method comprising supporting a hollow metallic fire collar around the piping in or adjacent to said bore, wherein intumescent material is arranged between the fire collar and the piping, and a sleeve of a fire resistant fabric extends within the collar and along and around the piping, the fire collar being arranged such that when subjected to fire such that the piping melts, the intumescent material and the fabric sleeve together form a barrier across the fire collar which blocks the bore.

In an embodiment of a method of the invention, the expansion of the intumescent material when subjected to fire pushes the fabric sleeve across the fire collar, and the expanded intumescent material and the fabric sleeve may intermingle such that the fabric of the sleeve reinforces the physical barrier which would have been formed by the intumescent material alone. The resulting physical barrier has been found to be capable of withstanding the water from a fire hose.

It would be possible to arrange the sleeve, the intumescent material and the metallic collar around the piping individually. However, it is generally preferred that the intumescent material is carried out on an interior surface of the fire collar.

Preferably, said fabric sleeve extends substantially around the whole of the inner periphery of said fire collar.

In an embodiment, said fabric sleeve is formed from a continuous piece of fabric.

In one embodiment, one end of said fabric sleeve is affixed to the interior of said collar at or near one end of the collar.

The fire resistant fabric from which the sleeve is formed may be any suitable fabric, for example, the fabric may be a silicon material and/or contain glass fibre.

In one embodiment, the collar carries the intumescent material on its interior surface, and the fabric sleeve extends within the collar such that the intumescent material is between the interior surface of the collar and said fabric sleeve.

The present invention also extends to a fire collar for use in a method as defined above.

According to a further aspect of the present invention, there is provided a fire collar for protecting a bore in a partition, the fire collar comprising a hollow metallic collar supporting intumescent material on an interior surface thereof, and a sleeve of a fire resistant fabric fixed to said collar and arranged to extend within said collar.

Preferably, with the fabric sleeve extending within said collar, the intumescent material is between said collar and said fabric sleeve.

The fabric sleeve may be formed from a single, continuous length of fabric or it may be formed from a slotted or gapped length of fabric.

The fabric sleeve may be permanently or releasably fixed to the collar. Preferably, one end of said fabric sleeve is affixed to said collar at or near one end thereof.

The fabric of the sleeve may be of any appropriate fire resistant material. For example, the fabric may be a silicon material and/or contain glass fibre.

Generally, the metallic collar is substantially cylindrical. In this respect, the cross section of the metallic collar will be substantially the same shape as that of the pipe and the bore in which the pipe extends. The metallic collar is preferably formed in one piece or may be formed of two interconnected parts to aid in fitting the collar onto a pipe. In a preferred embodiment, the metallic collar is formed of two hingedly connected parts.

The fire collar is preferably fixed to the partition through which the pipe it protects extends. To facilitate the fixing, the collar preferably carries one or more fixing flanges or lugs at an end thereof.

The fire collar as defined above, may be utilised in a method of the invention as also defined above.

The present invention also extends to apparatus for protecting intumescent material in pipe support means for pipes passing through walls, floors or ceilings, which apparatus comprises a fire-resistant fabric material for protecting the intumescent material from a water jet from a fire hose, and wherein the melting of the pipe causes the fabric material to move from a non-protecting position to a protecting position consequent upon the apparatus being subjected to a fire.

Preferably, the fire-resistant fabric material is a silicon material.

In an embodiment, the apparatus further comprises constrainer means arranged to constrain the intumescent material to expand inwardly and to move the fire-resistant fabric material to the protecting position consequent upon the apparatus being subjected to a fire.

The apparatus may alternatively be designed for retro fitting to existing pipe work or for forming part of new pipe work.

The intumescent material to be used in the fire collar or apparatus as defined above may be any suitable intumescent material. In one embodiment, the intumescent material is graphite based.

BRIEF DESCRIPTION OF THE DRAWINGS

Embodiments of the present invention will hereinafter be described, by way of example, with reference to the accompanying drawings, in which.

DETAILED DESCRIPTIONS OF THE PREFERRED EMBODIMENTS

Figure 1:
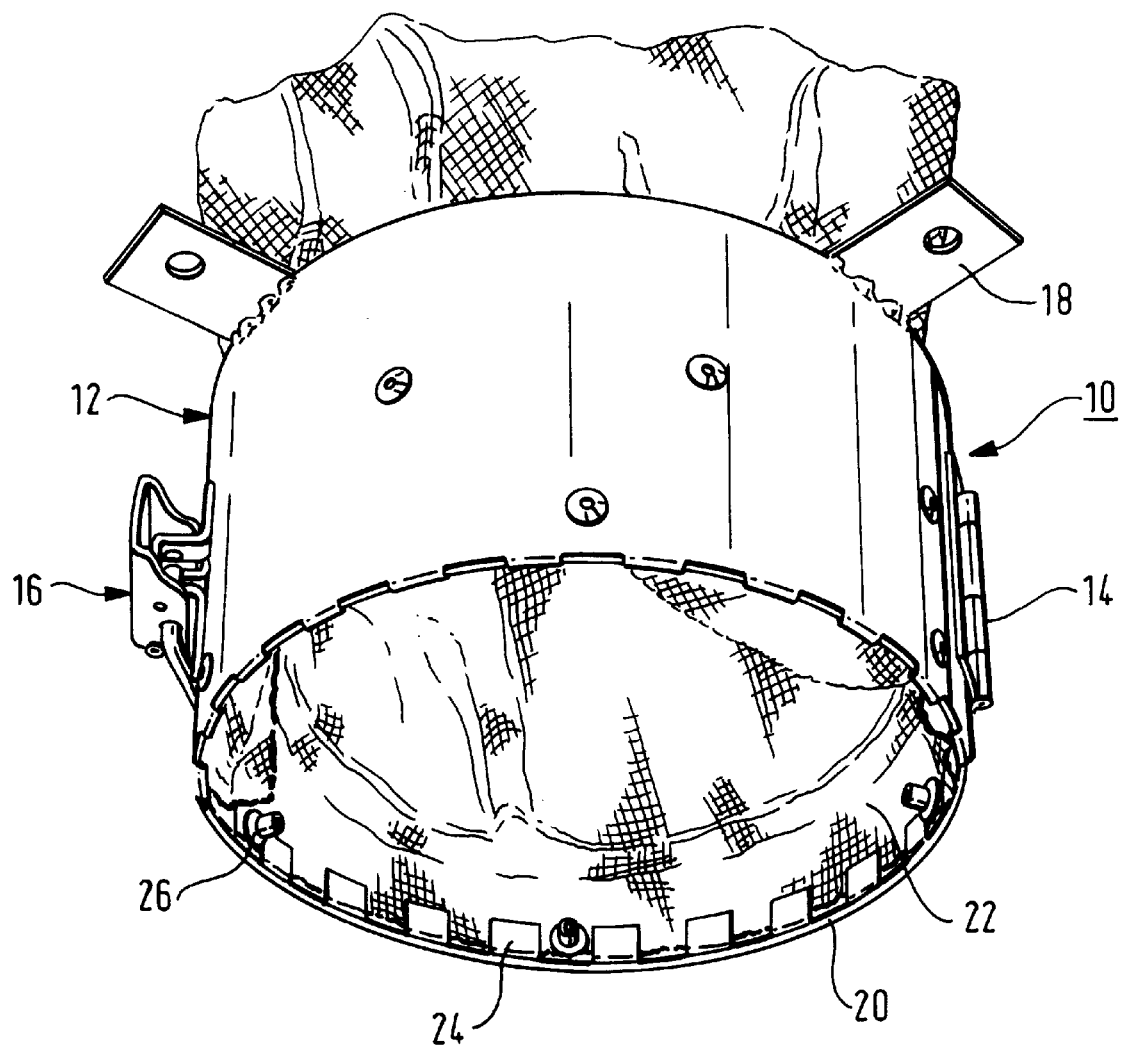
FIG. 1 shows a perspective view of a fire collar of an embodiment of the present invention.

FIG. 1 shows a perspective view of a fire collar 10 of the present invention which can be supported around a plastics material pipe such that, in the event of a fire, the fire collar produces a physical barrier blocking the bore in which the plastics material pipe extends. In this respect, the invention is described below with specific reference to the provision of a single fire collar around a single plastics material pipe. However, it would be possible to use a single fire collar with a bundle containing a number of pipes. Furthermore, the fire collar may be used with pipes of materials other than plastics material. The fire collar finds application when pipes are made or a material which melts or otherwise collapses when subject to fire. The fire collar may also be used, if required, with cabling or other elongate members with sheaths of a meltable material which pass through partitions such as walls, floors or ceilings.

The fire collar 10 shown in FIG. 1 comprises a substantially cylindrical, hollow, metal collar 12. In the embodiment illustrated, the metal collar 12 is formed in two halves which are hingedly connected at a longitudinally extending hinge 14 and releasably fastened together by way of a clip 16. This construction enables the fastening 16 to be released, and the two halves of the metal collar 12 to be moved apart so that the collar can be fitted around a pipe (not shown in FIG. 1). Once in situ, the fastening 16 is secured to secure the fire collar 10 in place around the pipe. In this respect, the fastening 16 may have any appropriate construction, but will generally be constructed in metal.

It would, of course, be possible, particularly where new buildings are being constructed, to provide the fire collar 10 with a metal collar 12 which is continuous and is not openable. Where facilities for opening the metal collar 12 are to be provided, it is convenient but not essential that the collar 12 be made in two substantially equal halves. As an alternative, the metal collar 12 may have a first sector which subtends less than 180° hingedly connected to a second, larger sector.

At one end, the metal collar 12 is provided with a number of flanges 18 which extend substantially radially. As will be seen, these flanges 18 are utilised to secure the fire collar 10 into position in use.

A layer of an intumescent material (not visible in FIG. 1) is affixed to the interior, substantially cylindrical, surface of the metal collar 12. Preferably, the layer of intumescent material is substantially cylindrical and thus extends over the whole of the inner circumference of the metal collar 12. Preferably, the layer of intumescent material extends axially of the metal collar 12 from the one end thereof with the flanges 18 towards the other, front end 20 thereof. However, in the embodiment illustrated, the intumescent material does not extend to the front end 20 of the collar 12. A gap is left for fixing means, described below, for a fabric sleeve 22.

The intumescent material may be any material which is caused to expand when subject to fire. Any suitable material may be used, and there are proprietary materials available which are well known to those skilled in the art. In an embodiment, a graphite based intumescent material is utilised.

A fabric material sleeve 22 is affixed to the metal collar 12 to extend within the collar and generally axially thereof. The sleeve 22 is formed from a length of a fire resistant fabric. Any appropriate fire resistant fabric may be used. For example, the fabric may be a silicon based fabric or a glass fibre fabric. The length of fire resistant fabric is affixed around all of the circumference of the front edge 20 of the metal collar 12 such that it defines a generally continuous cylindrical sleeve 22. The axially extending edges of the fabric of the sleeve may be abutted, or overlapped, or joined. As indicated, the sleeve 22 generally has an axial length which is greater than that of the collar 12.

In the illustrated embodiment, the sleeve 22 is fixed to the metal collar 12 both by a number of turned over tags 24 which are integrally formed with the metal collar 12, and by metal studs 26 extending through the collar 12. Of course, the sleeve 22 may be fixed to the collar 12 in any suitable manner. For example, the sleeve 22 may be riveted and/or adhered in position. It is also possible for the sleeve 23 to be releasably engaged with the metal collar 12. Alternatively, the main elements of the fire collar 10, namely the metal collar 12, the intumescent material, and the fabric sleeve 22 may be provided separately and held in their relative positions when affixed in situ onto a plastics pipe.

Figure 3:
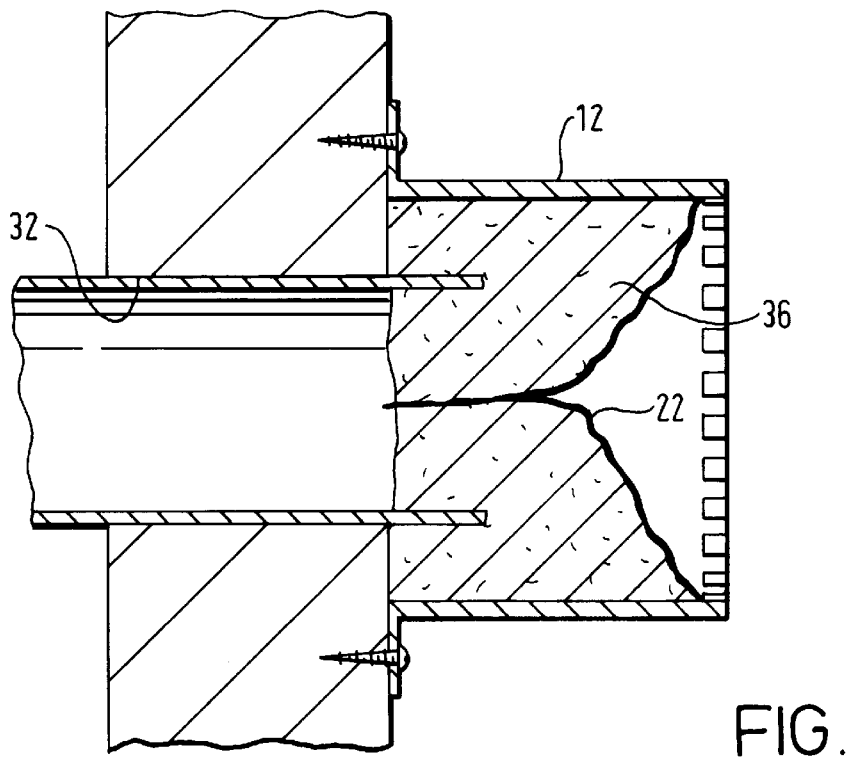
FIG. 3 shows schematically the construction of FIG. 2 after a fire.

FIG. 3 shows a section through the collar 10 of FIG. 1 when in position around a plastics material pipe 30. In this case, the pipe 30 extends through a bore 32 in a partition 34 which may be, for example, a wall, floor or ceiling. It will be seen that the fire collar 10 is arranged around the pipe 30 and is fixed to the partition 34 by way of screws extending through the flanges 18. It will be appreciated that in the fixed position the fabric material sleeve 22 surrounds and contacts the periphery of the pipe 30 adjacent the bore 32 and the intumescent material 36 within the collar 10 is between the fabric sleeve 22 and the interior surface of the metal collar 12.

Figure 2:
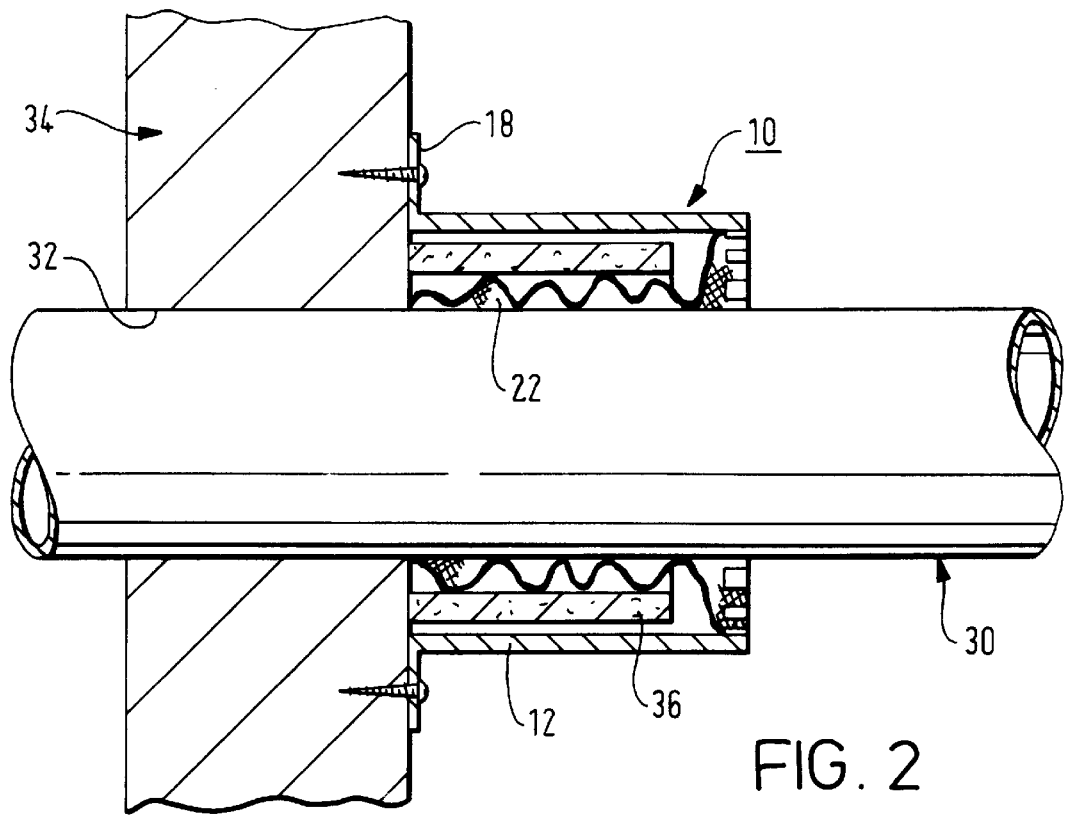
FIG. 2 shows a section through the fire collar of FIG. 1 when in position around a plastics pipe.

FIG. 3 indicates the situation when the pipe 30 and fire collar 10 of FIG. 2 have been subjected to a fire such that the pipe 30 on the fire collar side of the partition 34 has melted. In that eventuality the intumescent material 36 expands. It is constrained from expanding radially outwardly by the metal collar 12, and so expands radially inwardly. As the intumescent material expands inwardly, it pushes the fabric sleeve 22 radially inwardly. The fabric of the sleeve 22 comes together to extend across the opening of the bore 32 and becomes intimately mixed with the expanding intumescent material 36. Thus, the barrier across the bore 32 formed by the intumescent material 36 might be thought of as being reinforced by the fabric material of the sleeve 22. As a result, a physical barrier is formed across the bore 32 which is considerably stronger than that which would have been formed by the expanded intumescent material alone. The strength of the barrier formed may be sufficient to withstand the force of the water from a fire hose for at least 20 minutes.

Figure 4:
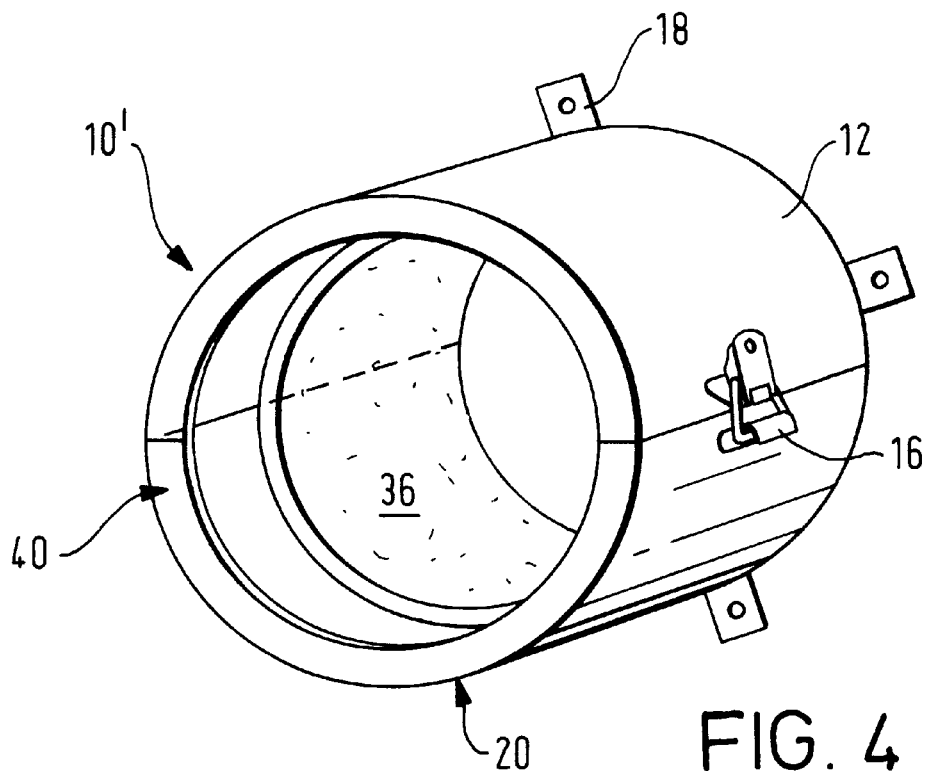
FIG. 4 shows a perspective view of an alternative embodiment of a fire collar.
Figure 5:
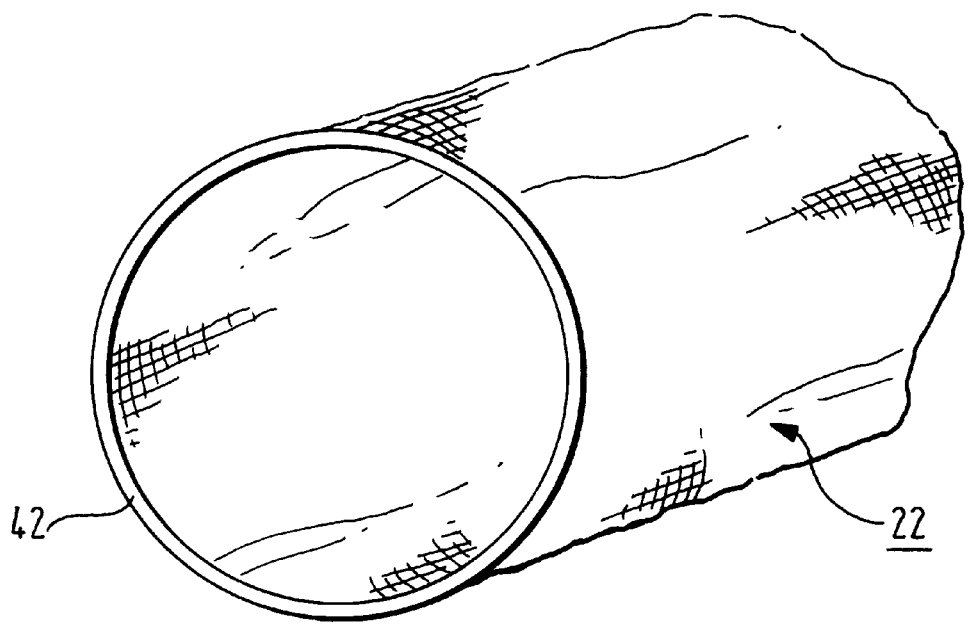
FIG. 5 shows a fire resistant fabric sleeve for use with the collar of FIG. 4.

FIGS. 4 and 5 show an alternative embodiment of a fire collar 10', in which the fabric material sleeve 22 is engaged with the metal collar 12 rather than being affixed thereto. In this respect, the metal collar 12 is substantially identical to that in the previous embodiment except that at its front end 20 it is provided with a radially extending rim 40. As shown in FIG. 5, the fire resistant fabric sleeve 22 comprises a substantially cylindrical sleeve of a fire resistant fabric which is attached to a split steel ring 42. In use, the steel ring 42 is engaged within the metal collar 12 so that it engages with the inner side of the rim 40. The ring 42 is a tight fit within the metal collar 12 when the collar is closed.

Figure 6:
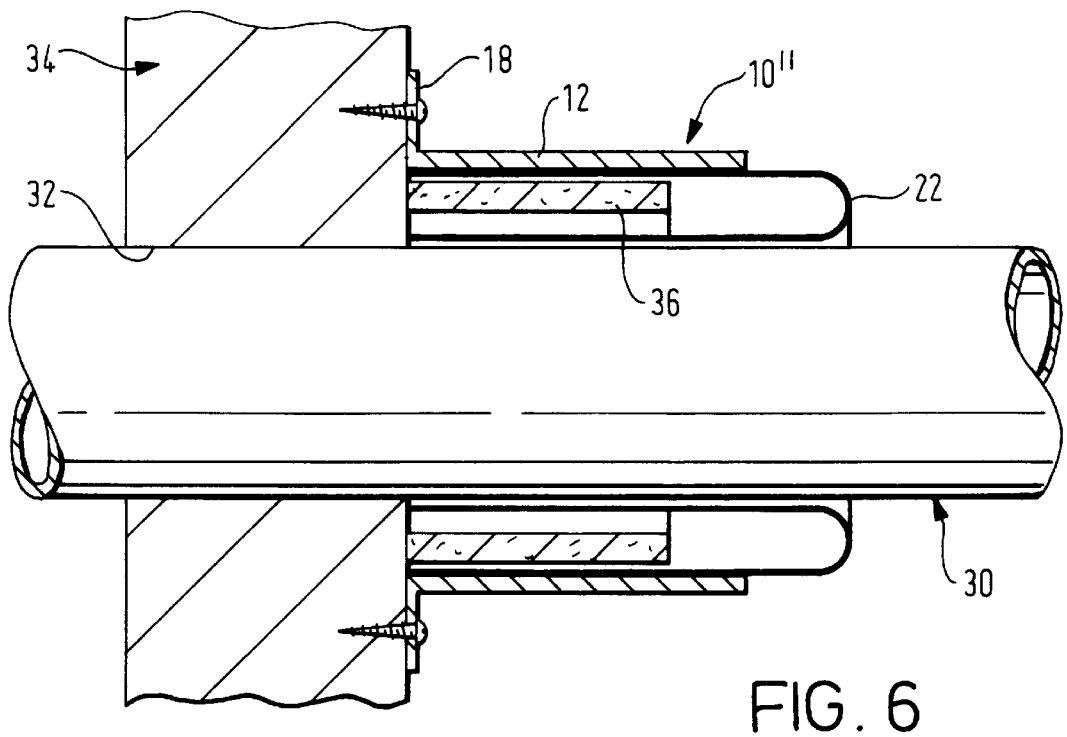
FIG. 6 shows a section through a fire collar in situ on a plastics material pipe showing a further embodiment of a fire collar.

FIG. 6 shows a section through a further embodiment of a fire collar 10" in situ on a plastics material pipe 30. As previously, the fire collar 10" includes a substantially cylindrical metal collar 12 fixed to the partition 34 by way of flanges 18. In the embodiment of FIG. 6, the sleeve 22 of fire resistant fabric is affixed to the rear end of the metal collar 12 adjacent the flanges 18 and is arranged to extend within the collar along the axial extent of the metal collar 12 and then to be bent over to extend back within the collar 12 along the length of the pipe 30. A sleeve of intumescent material 36 is inserted within the two lengths of the fabric of the sleeve 22 such that the material of the sleeve 22 passes along both sides of the intumescent material 36.

In the event of a fire, the intumescent material 36 will expand radially inwardly, as described above, and will move the sleeve 22 and intermingle with the material thereof. Thus, a barrier, as described above, across the bore 32 will be formed.

Figure 7:
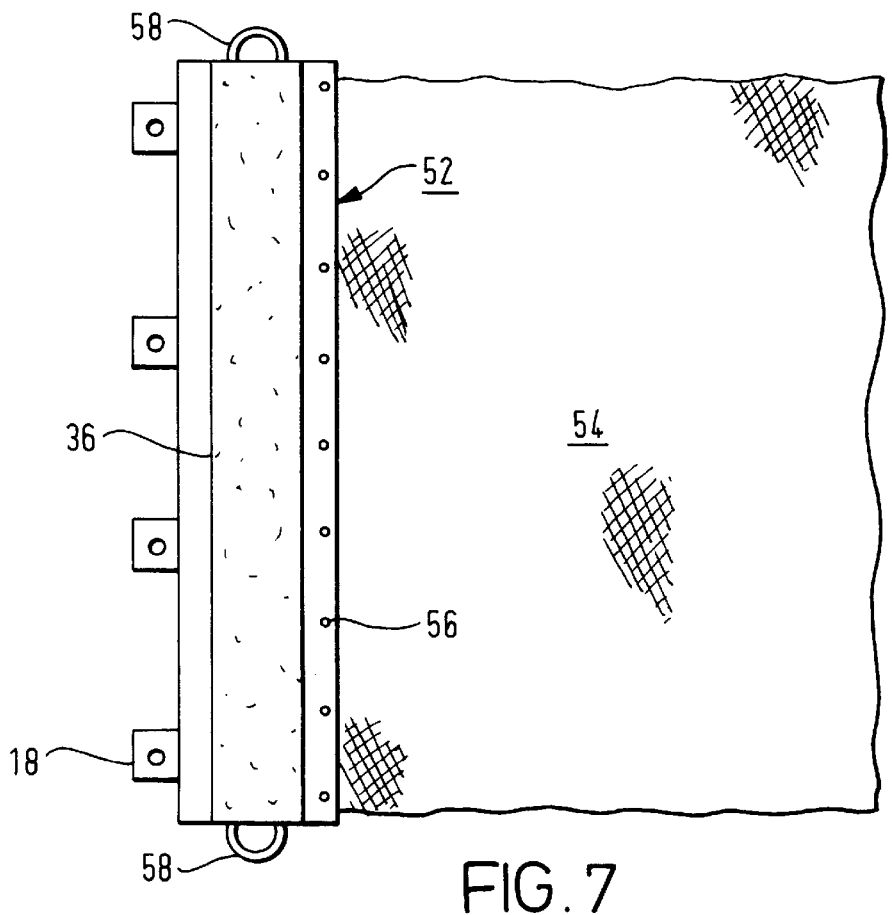
FIG. 7 shows a plan view of a strip of a further embodiment of a fire collar of the invention.

FIG. 7 shows how a further embodiment of a fire collar of the invention may be formed in situ from a strip 52 of a metal material along which a strip of intumescent material 36 is attached. Along one edge, the metal strip 52 is provided with luge or flanges 18. Along the other edge, the metal strip 52 has a length of fire resistant material 54 attached thereto by way of rivets indicated at 56. In use of the strip 52 shown in FIG. 7, the material 54 is wrapped around a plastics material pipe to form a sleeve enclosing the pipe. Then the metal strip 52 is bent back over the material 54 to lay the intumescent material 36 carried thereby between the material 54 and the metal strip 52. The metal strip 52 is then bent along it length to form a substantially cylindrical collar and ends thereof are fastened by way of a fastening device indicated at 58. Screws are then passed through the fixing luge 18 to fix the completed apparatus to a wall or other barrier. It will be appreciated that at the end of this process a collar, as collar 10, will have been positioned around a plastics material pipe and fixed to the wall through which the pipe extends. It will also be appreciated that the resulting fire collar so formed will function, in the event of a fire, substantially as described previously.

The metal collar 12, 52 of the fire collars described and illustrated may be made of any material capable of retaining rigidity and integrity in the event of a fire. Generally, the metal of the collar 12, 52, is steel.

The fire collars described and illustrated are generally cylindrical as the pipes around which they are fitted are generally cylindrical. Of course, if it is wished to protect partitions having pipes and other structures therethrough which have cross-sections which are other than circular, the fire collar may have a correspondingly non-circular cross-section.

It will be appreciated that modifications of and variations in the specific embodiments described and illustrated may be made within the scope of the appended claims.

I claim:

1. A method of protecting a bore in a partition through which meltable piping extends, the method comprising:

supporting a metallic fire collar around the piping in or adjacent to a bore through which the piping extends, said fire collar being elongate with first and second spaced ends, and said fire collar being substantially cylindrical;

positioning a fire resistant fabric sleeve to extend within said fire collar and along and around the piping in contact with the piping, said fabric sleeve being elongate with first and second spaced ends, said first end of said fabric sleeve being affixed to said first end of said collar, and the remainder of the length of said fabric sleeve being unconstrained and not affixed to said fire collar; and interposing intumescent material between said fire collar and said fabric sleeve such that the intumescent material substantially surrounds the piping;

said fire collar, fabric sleeve and intumescent material being arranged such that when the piping melts under the effect of fire, said intumescent material expands towards the piping and pushes said unconstrained fabric sleeve inwardly whereby said intumescent material and said fabric sleeve together form a barrier across said fire collar which blocks the bore.

2. A method according to claim 1, including permanently fixing said first end of said fabric sleeve to said first end of said fire collar.

3. A method according to claim 1, including releasably fixing said first end of said fabric sleeve to said first end of said fire collar.

4. A method according to claim 1, making the length of said fabric sleeve greater than the length of said fire collar.

5. A method according to claim 1, placing said intumescent material on an interior surface of said fire collar.

6. A method according to claim 1, including forming said fabric sleeve from a continuous piece of fabric.

7. A fire collar apparatus for protecting a bore in a partition through which meltable piping extends, the fire collar apparatus comprising:

an elongate metallic fire collar having first and second spaced ends, said fire collar being substantially cylindrical and defining a curved interior surface;

a fire resistant fabric sleeve extending within said fire collar, said fabric sleeve being elongate and having first and second spaced ends, said first end of the fabric sleeve being affixed to said first end of said fire collar, and the remainder of the length of said fabric sleeve being unconstrained; and intumescent material supported on the interior surface of said fire collar such that said intumescent material is interposed between said fire collar and said fabric sleeve.

8. Fire collar apparatus according to claim 7, wherein said fabric sleeve is formed from a single, continuous length of fabric.

9. Fire collar apparatus according to claim 7, wherein said fabric sleeve is formed from one of a slotted and gapped length of fabric.

10. Fire collar apparatus according to claim 7, wherein said first end of said fabric sleeve is permanently fixed to said first end of said fire collar.

11. Fire collar apparatus according to claim 7, wherein said first end of said fabric sleeve is releasably fixed to said first end of said fire collar.

12. Fire collar apparatus according to claim 7, wherein the fabric of said sleeve contains glass fiber.

13. Fire collar apparatus according to claim 7, wherein said fire collar is formed in one piece.

14. Fire collar apparatus according to claim 7, wherein said fire collar is formed of two hingedly connected parts.

15. Fire collar apparatus according to claim 7, wherein said fire collar carries at least one fixing flange at one of said first and second ends thereof.

16. Fire collar apparatus according to claim 7, wherein said fire-resistant fabric is a silicon material.

17. Fire collar apparatus according to claim 7, wherein said intumescent material is a graphite based intumescent material.

18. Fire collar apparatus according to claim 7, wherein the length of said fabric sleeve is greater than the length of said collar whereby said second end of the fabric sleeve projects beyond said end of said fire collar.

* * * * *